United States Patent
Abuelsaad et al.

(10) Patent No.: US 8,165,612 B2
(45) Date of Patent: Apr. 24, 2012

(54) METHODS AND APPARATUS FOR ACCESSING COMPUTER NETWORK ACCESSIBLE SERVICE APPLICATIONS VIA A MOBILE TERMINAL

(75) Inventors: Tamer E. Abuelsaad, Poughkeepsie, NY (US); Kelly Abuelsaad, Poughkeepsie, NY (US); Dinesh C. Verma, New Castle, NY (US)

(73) Assignee: International Business Machines Corporation, Armonk, NY (US)

( * ) Notice: Subject to any disclaimer, the term of this patent is extended or adjusted under 35 U.S.C. 154(b) by 362 days.

(21) Appl. No.: 12/479,411

(22) Filed: Jun. 5, 2009

(65) Prior Publication Data
US 2010/0311443 A1    Dec. 9, 2010

(51) Int. Cl.
*H04W 4/00* (2009.01)

(52) U.S. Cl. ......... 455/466; 370/338; 370/352; 709/224

(58) Field of Classification Search .................. 455/466; 370/338, 352; 709/224
See application file for complete search history.

(56) References Cited

U.S. PATENT DOCUMENTS

| | | | |
|---|---|---|---|
| 2007/0117578 A1* | 5/2007 | Yim et al. ...................... | 455/466 |
| 2007/0178881 A1* | 8/2007 | Teunissen et al. ............. | 455/410 |
| 2007/0233806 A1 | 10/2007 | Asadi ............................. | 709/217 |
| 2008/0154924 A1 | 6/2008 | Ding et al. .................... | 707/100 |
| 2008/0165045 A1 | 7/2008 | Cvetanovic et al. .......... | 341/176 |

* cited by examiner

*Primary Examiner* — Kamran Afshar
*Assistant Examiner* — Manpreet Matharu
(74) *Attorney, Agent, or Firm* — Kermit Lopez; Luis M. Ortiz; Melissa Asfahani

(57) ABSTRACT

Methods and systems for accessing computer network accessible services, such as internet based service applications, via a mobile terminal of a mobile telecommunication system using a mediation layer between a person's mobile terminal and the IT world. The mobile terminal in response to receiving user inputs interacts with this mediation layer via text messages. The mediation layer turns around and executes the appropriate IT services on behalf of the mobile terminal user.

17 Claims, 6 Drawing Sheets

METHODS AND APPARATUS FOR ACCESSING COMPUTER NETWORK ACCESSIBLE SERVICE APPLICATIONS VIA A MOBILE TERMINAL

TECHNICAL FIELD

Embodiments relate to fields of computer networks and communication systems and, more particularly but not exclusively, to methods and apparatus for accessing internet service applications and other computer network accessible service applications over a mobile telecommunications network via a mobile terminal.

BACKGROUND

Information Technology (IT) has had a significant impact on the society and has touched all aspects of our lives. So far, computers and expensive devices have fueled this growth. It has resulted in several benefits to the society. The challenge now is to take this success of IT to its next level where IT services can be accessed by masses. The term "Masses" here refers to people that fall in one or all of the following categories: (1) people not yet IT literate, (2) people that that do not have the purchase power to use the current IT delivery mechanisms (PC centric model) and (3) people that do not find current IT solutions and services relevant to their life and business. Interestingly, a huge portion of the world's population falls in this category.

A system and method is needed which can enable people of the aforementioned above categories to access internet service applications more easily. It is believed that the methods and systems of the illustrative embodiments help provide such a need.

BRIEF SUMMARY

The following summary of the invention is provided to facilitate an understanding of some of technical features related to techniques, apparatus and systems for accessing internet based service applications or other computer network accessible service applications via a mobile terminal and is not intended to be a full description. Examples of methods, apparatus and systems are described for accessing internet based service applications via a mobile terminal of a mobile telecommunication network. A full appreciation of the various aspects of the invention can be gained by taking the entire specification, claims, drawings, and abstract as a whole.

The aforementioned aspects of the invention and other objectives and advantages can now be achieved as described herein.

According to one aspect, a method is described for accessing computer network accessible service applications via a mobile terminal. A user profile associated with a user of one or more mobile terminals can be provided. The user profile contains information for executing one or more computer network accessible services. One or more text messages, such as SMS text messages, sent from one or more mobile terminals can be received at a mediation hub over a mobile telecommunication network for requesting execution of the computer network accessible application(s). The text message(s) received from the mobile terminal can be interpreted based on the user profile. The computer accessible network application(s) can be executed based on the interpretation of the text message(s).

The method for accessing network accessible service applications enables internet based services or other computer network accessible services to be accessed and controlled using a mobile phone, or any other type of mobile terminal, that is capable of simple text messaging over a mobile telecommunication network.

The method can include using text message(s) to select from information contained in the user profile information for executing a particular one of a plurality internet service applications and/or a particular one of a plurality of internet service application tasks.

One or more text messages containing a predefined security word or phrase can be sent from the mobile terminal to the mediation hub and used by the mediation hub to open or activate a provided user profile.

The text message(s) can comprise one or more text message aliases and/or short cut which can be mapped to commands or other information stored in the user profile for executing the computer network accessible service application.

According to another aspect, there is described an automated system for accessing computer network service applications via a mobile terminal. The system can include one or more user profiles associated with a user of at least one mobile terminal and a mediation controller. The user profile(s) can contain information for executing one or more computer network service applications. The mediation controller can be configured to receive over a mobile telecommunication network one or more text messages from the user mobile terminal for requesting execution of at least one computer network accessible service application, interpret the text message(s) from the user mobile phone terminal based on the user profile associated with the user, and execute the computer network accessible service application(s) using the interpretation of the text message(s).

According to yet another aspect, a computer program product comprising: a computer—usable data carrier storing instructions that, when executed by a computer, cause the computer to perform a method for accessing computer network accessible service applications via mobile terminal is provided. The method can comprise providing a user profile associated with a user of one or more mobile terminals, the user profile containing information for requesting execution of one or more computer network accessible services, receiving over a mobile telecommunication network one or more text messages from the user mobile terminal for use in executing one or more computer network accessible service applications, interpreting the text message(s) from the user mobile phone terminal based on the user profile associated with the user, and executing the internet service application(s) using the interpretation of the text message(s).

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment of the present invention and are not intended to limit the scope of the invention.

Technical features described in this application can be used to construct various systems for accessing internet based service applications or other computer network accessible service applications via a mobile terminal of a mobile telecommunication system. A mediation layer between a person's mobile terminal and the IT world can be provided. The mobile terminal in response to receiving user inputs interacts with this layer via text messages. The mediation layer turns around and executes the appropriate IT services on behalf of the mobile terminal user.

The method and systems for accessing internet based service applications using a mobile terminal according to the illustrative embodiments can enable users to access internet based applications or other computer network accessible applications by using simple text messaging functionality of a mobile terminal.

As will be explained in more detail below, the mobile terminal can employ an efficient encoded protocol on SMS or other text message protocol to contact a mediation hub implemented, for example, on a proxy server. A user profile is accessed at the proxy level. The internet based application or other computer network accessible application is then invoked with the user profile by the proxy. Status is returned to the client by efficiently encoded SMS messages. Using text messaging to access the particular internet based service application therefore drastically simplifies the access process and enables such access to be achieved using any type of mobile phone or terminal that supports text messaging via a telecommunications network.

A person that is not IT savvy or IT literate can interact with IT systems and services available throughout the world. The first component is the mediation layer which includes the text message hub hereinafter referred to as the mediation hub. The purpose of the mediation hub is to receive a text message from the user and map it to the execution of the appropriate IT Service. Here are a few examples of IT services that can be executed on behalf of the user:

How many new email messages do I have?
Give me subjects of all new messages
Give me first email. Give me fourth email
Delete email message number 2
What is my bank account balance?
Pay my electric bill
Make out rent check and send it out
What is my calendar for today?

Figure 1:
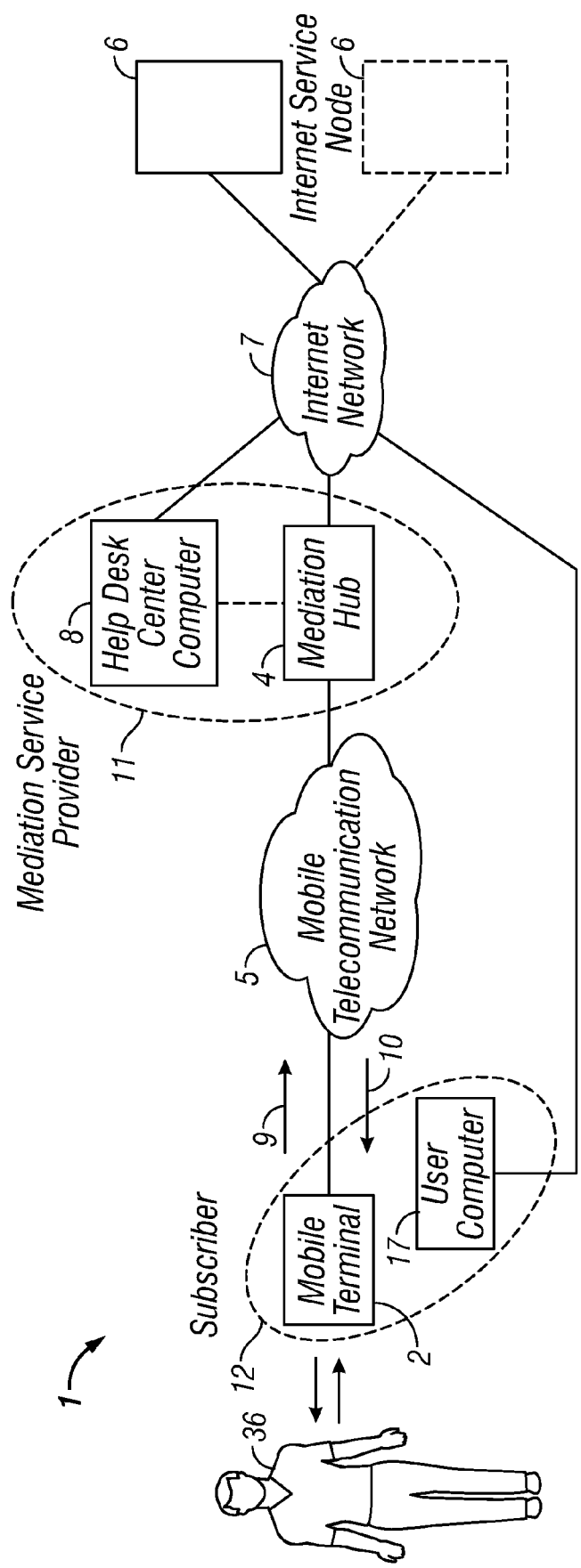
FIG. 1 illustrates a high level schematic diagram of a communication network for accessing computer network accessible applications using a mobile terminal according to one embodiment.

FIG. 1 illustrates a high level schematic diagram of a communication network for the purpose of illustrating the system for accessing computer network accessible applications using a mobile terminal according to one embodiment. The communication network 1 comprises a text messaging mobile telecommunication network 5 interconnecting a source mobile terminal 2 and a mediation hub 4. In the illustrated embodiment of FIG. 1, the text messaging telecommunication network supports short message service (SMS) text messaging transmitted from a mobile terminal 2 over a mobile telecommunications network 5. The text messaging telecommunication network can be any type of telecommunications network capable of supporting mobile terminal text messaging such as, for example, UMTS, GSM or other known or not yet developed mobile telecommunications networks. Other known or not yet developed types of text messaging technology suitable for transmitting text messages from a mobile terminal over a mobile telecommunications network can also be used. Mobile terminal 2 can be any type of terminal supporting text messaging transmission and reception over a mobile telecommunication network 5. For example, mobile terminal 2 can be a simple mobile phone supporting text messaging or an intelligent device such as a smart phone or PDA.

Mediation hub 4 can be implemented using a single piece of equipment or a plurality of electronic devices and computers interconnected locally or remotely via a suitable network. Mediation hub 4 is configured as an intermediate hub which interfaces the text message network 5 with internet service nodes 6 via internet network 7 and which enables access to internet based service applications using text messaging sent from the mobile terminal 2. Whilst in this illustrative embodiment, the computer network accessible application being accessed is an internet based service application the mediation hub 4 can be configured to interface with other types of computer networks in order to access other types of service applications running on those computer networks.

Figure 2:
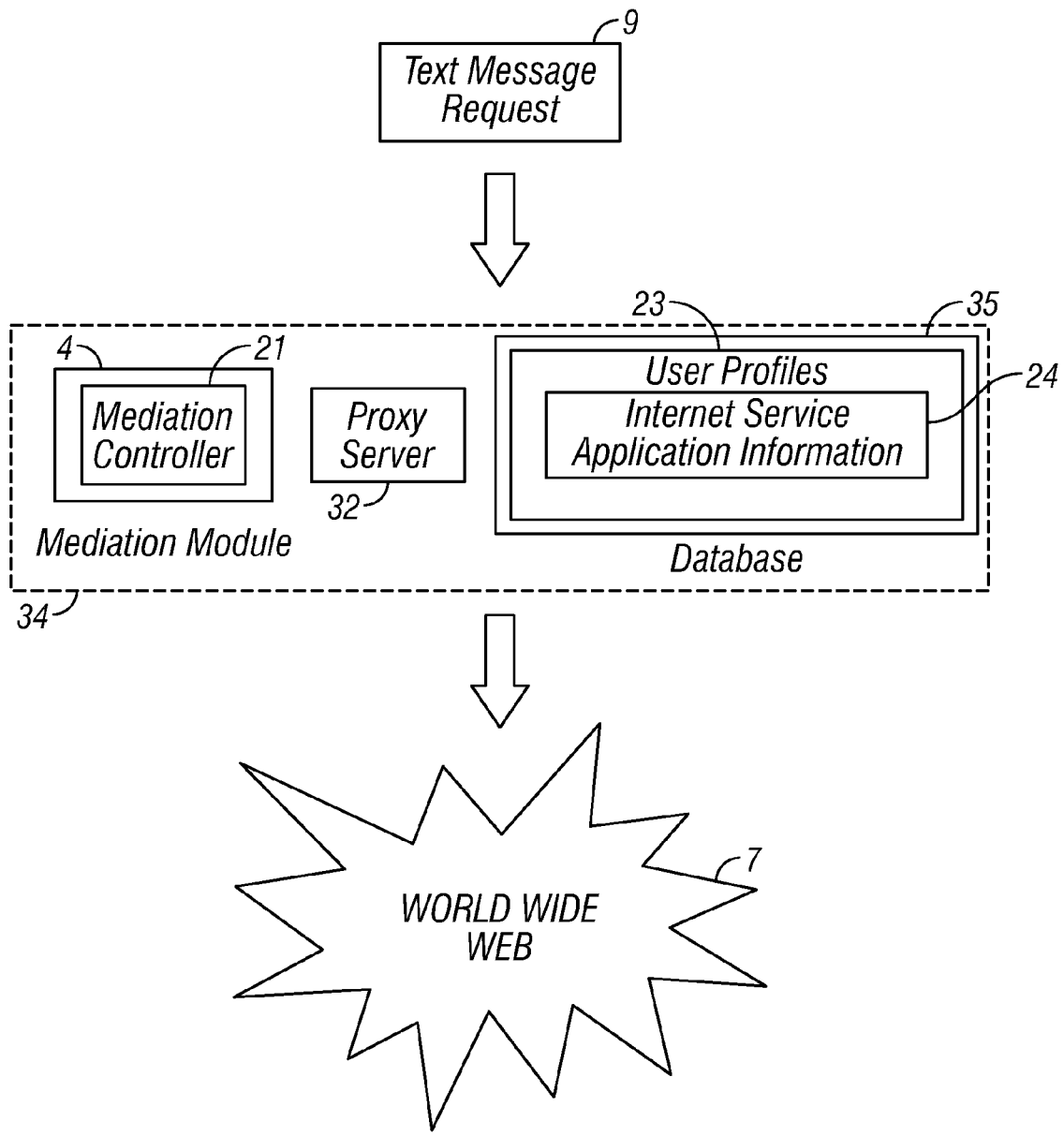
FIG. 2 illustrates a mediation layer according to one embodiment.

As already mentioned the mediation hub 4 can be implemented in a single device or networked devices. Such device or devices can be any kind of central processing unit (CPU) based system such as a personal computer (PC) or other microprocessor based system such as a digital signal processor based system. Mediation hub 4 forms part of the mediation layer. One such non-limiting exemplary implementation of a mediation layer according to one embodiment is schematically illustrated in FIG. 2. Mediation layer 34 comprises the mediation hub 4, user profiles 23, and proxy server 32. The mediation hub 4 can be implemented as a mediation module. User profiles 23 are contained in database module 35. Mediation layer 34 can be configured to send and receive text messages over the mobile telecommunication network, for example, using a text message transceiver (not shown). Mediation layer 34 can also be configured to access the internet using a suitable internet access device (not shown). As indicated in FIG. 2, a text message request 9 interacts with the mediation layer 34 which then interacts with the World Wide Web 7. In the illustrative embodiment of FIG. 2, proxy server 32, mediation hub 4, and the database 35 are configured to communicate as necessary to perform the methods of accessing computer network accessible services according to the illustrative embodiments.

Mediation and/or database modules can be implemented in software and/or hardware. Mediation and database modules can be implemented on one or more computers. For example, the modules can be implemented on the proxy server 32 or on one or more other servers operably connected to the proxy server 32 (as shown in FIG. 2). The database module 35 can be implemented locally together with the mediation module or accessible by the mediation module from a remote location. Whilst a database module is used in FIG. 2, a file system or other storage system for storing data can be used instead of a database. The aforementioned examples of implementing the modules are non-limiting and other types of implementations are envisaged.

An operating system runs on each server or computer running the modules and may be a commercially available or open source such as (but not limited to) Apple, Windows, Unix, Linux or others not yet developed. Instructions for the operating system and applications or programs are stored in storage devices such as a hard drive. A user interface (not shown) can be operably connected to the computer(s) or server(s) to allow a human operator to manipulate the mediation hub 4, as required.

As will be explained in more detail below, mediation hub 4 is configured to receive one or more send text messages 9 received from the user mobile terminal 2 for use in executing a particular internet service application running on an internet service node 6 User profiles 23 are stored in database 35 and can be associated with respective users, for example, by means of assigning user accounts including the user profiles to respective users and associating the identity of the mobile terminal(s) of the users to the user profile. Mediation hub 4 determines a user profile 23 associated with the received text message(s) using the identity of the mobile terminal. One way of doing this is to use the origin of the text message (phone number of the sender) to open the corresponding user profile. Mediation hub 4 interprets the received text message(s) based on the associated user profile. Using this interpretation of the received text message(s) from the user mobile phone terminal, the mediation hub 4 executes the desired internet service application(s) running on the particular internet service node 6 through the internet 7. Mediation hub 4 is also configured to convert internet based replies received from the internet service based application into corresponding reply text messages 10 for sending to the mobile terminal through the text messaging network.

Figure 3:
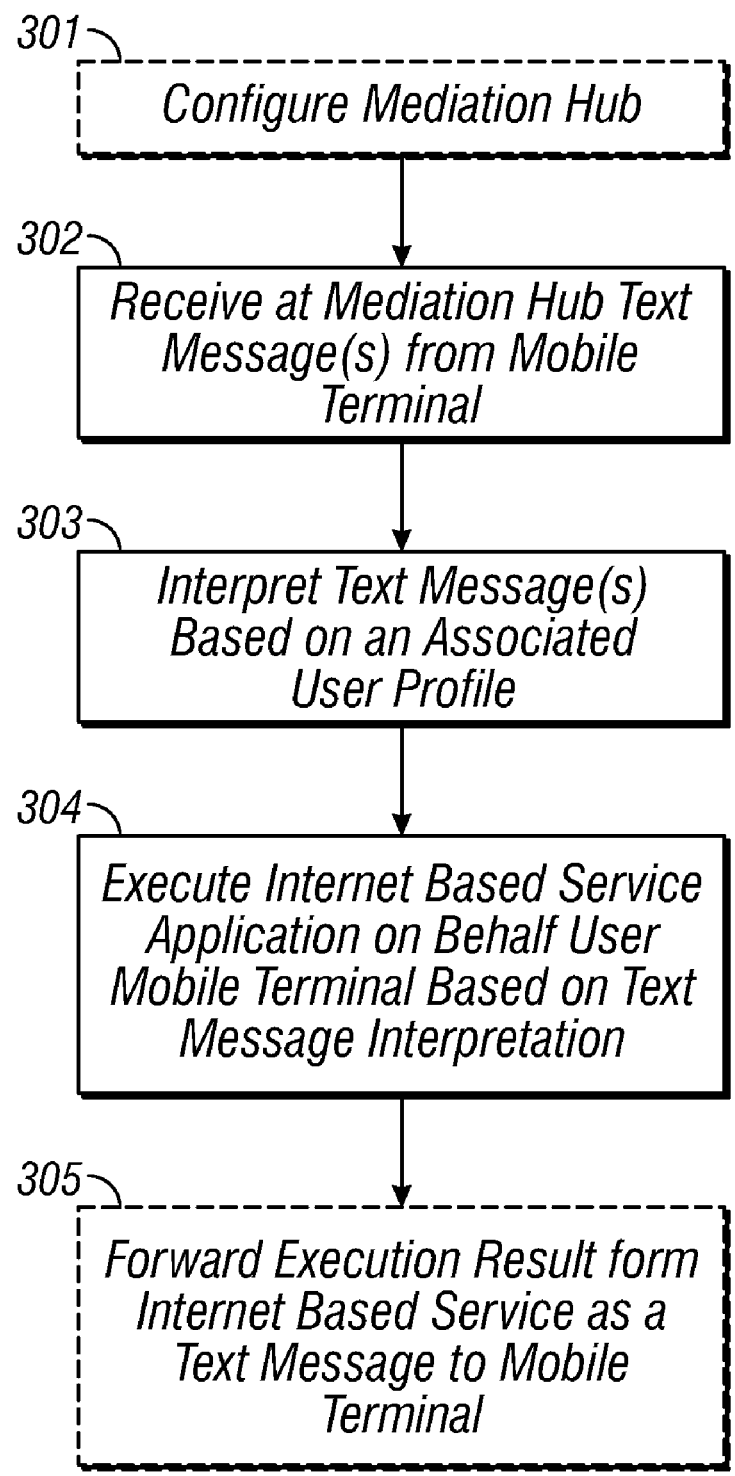
FIG. 3 illustrates a flow chart outlining a method for accessing internet based service applications via a mobile terminal.

FIG. 3 illustrates a flow diagram generally outlining a method for accessing internet based service applications via a mobile terminal. Initially the mediation hub 4 is configured (s301). Once configured, mediation hub 4 receives one or more text messages (s302) from a mobile terminal via a mobile telecommunication network. The one or more text messages can be interpreted based on an associated user profile (s303). An internet based service application is executed on behalf of the user of the mobile terminal based on the interpretation of received text message(s) (s304). Where appropriate, a result of executing the internet based service application is forwarded from the internet based service as a text message to the mobile terminal (s305).

Method of FIG. 3 can be implemented, for example, in the system of FIGS. 1 and 2. Mediation hub 4 and associated mediation services can be administered and operated by a service provider 11. Mobile terminal 2 can be operated by a subscriber 12. Provider of service 11 can configure the mediation hub 4 and provides subscriber 12 access to the mediation hub 4 through their mobile terminal 2 to enable the subscriber 12 to execute the internet based application services using text messaging from their mobile terminals. Mediation hub 4 is preconfigured to include a plurality of user profiles 23 associated with respective users of one or more mobile terminals. Each user profile 23 contains information such as commands and/or input parameters, for use in executing particular internet based service applications. Information relating to each particular internet based service application can be associated with particular text message(s) 9 such that the mediation hub 4, in response to receiving the particular text message 9, can use the information to execute the particular internet based service application.

For example, the information for use in executing a user's e-mail internet service application running on internet node 6 can be e-mail commands to which the text messages can be mapped for executing the e-mail service. User profiles 23 can include information for executing a range of different tasks using the same internet service application. In one embodiment, the user profiles 23 include information for executing a range of different internet service applications such as online banking, online bill payment, e-mail, and online calendar service applications. These different internet service applications can be operated by different service providers.

The user profile 23 can be configured in different ways. For example, the user profile 23 can be configured via a help center which can connect either locally to the mediation hub, for example, via a user terminal connected to the mediation server, or remotely, for example, via a user terminal connected to the mediation server through the internet. The user profile 23 can be setup through the internet via a web interface running on the user terminal.

The user's profile can be set up to contain such things as the user's accounts (bank, email, bills, etc . . . ). For each account, a user id and password are usually required and sometimes a pass phrase. In order for the profile to act as the user, this information must be recorded accurately. Also, the internet based services and transactions that the user is allowed to execute are recorded in the user profile 23. The user can assign nick names or aliases to the services and transactions in order to cut down on the size of the text messages. Once the user's profile is in place, the provider of service needs to identify all the trusted sources that the user can send text messages from. The trusted source identification and security can be determined by the provider of service, for example, by using the MAC address of the mobile terminal wishing to connect to the mediation hub.

Once the mediation hub is preconfigured, the hub can receive a message from the user, loads his/her profile, and interpret the message content based on the loaded profile. If the message is valid and understood, the mediation hub will proceed to execute IT services on behalf of the user. The execution of the IT services is handled by the provider of service; it can range from a custom web service to deal with specific transaction to executing a third party's remote transaction. The mediation hub can allow users to interact with it via a web browser as well as voice recognition. In order to make message sending even easier, the user can have all the text messages programmed in his/her cell phone or other mobile terminal as quick messages. The mediation hub will also allow the user to ask for all the messages accepted as a guide or help in case the user forgets the format. The user is allowed to change the settings of his/her profile on the mediation hub at any given time. With this system, users that do not have access to IT services will be able to access them in a simple fashion. It is also believed that savvy IT users may prefer using this system over conventional methods.

Heretheto now, the masses had little option but to access these internet based applications by using personal computer terminals or intelligent mobile terminals, such as smart phones or PDAs, that run an application program that provide a web browser interface on the terminal so that the user can access the particular service application. The methods and systems of the illustrative embodiments enable any type of mobile phone or terminal that supports text messaging to be used to access the particular internet based service application so that people, not yet literate in computers and web access or people that do not have the purchase power to use such computers employing web access mechanisms, can nevertheless access the internet based service applications simply and effectively using text messaging.

Figure 4:
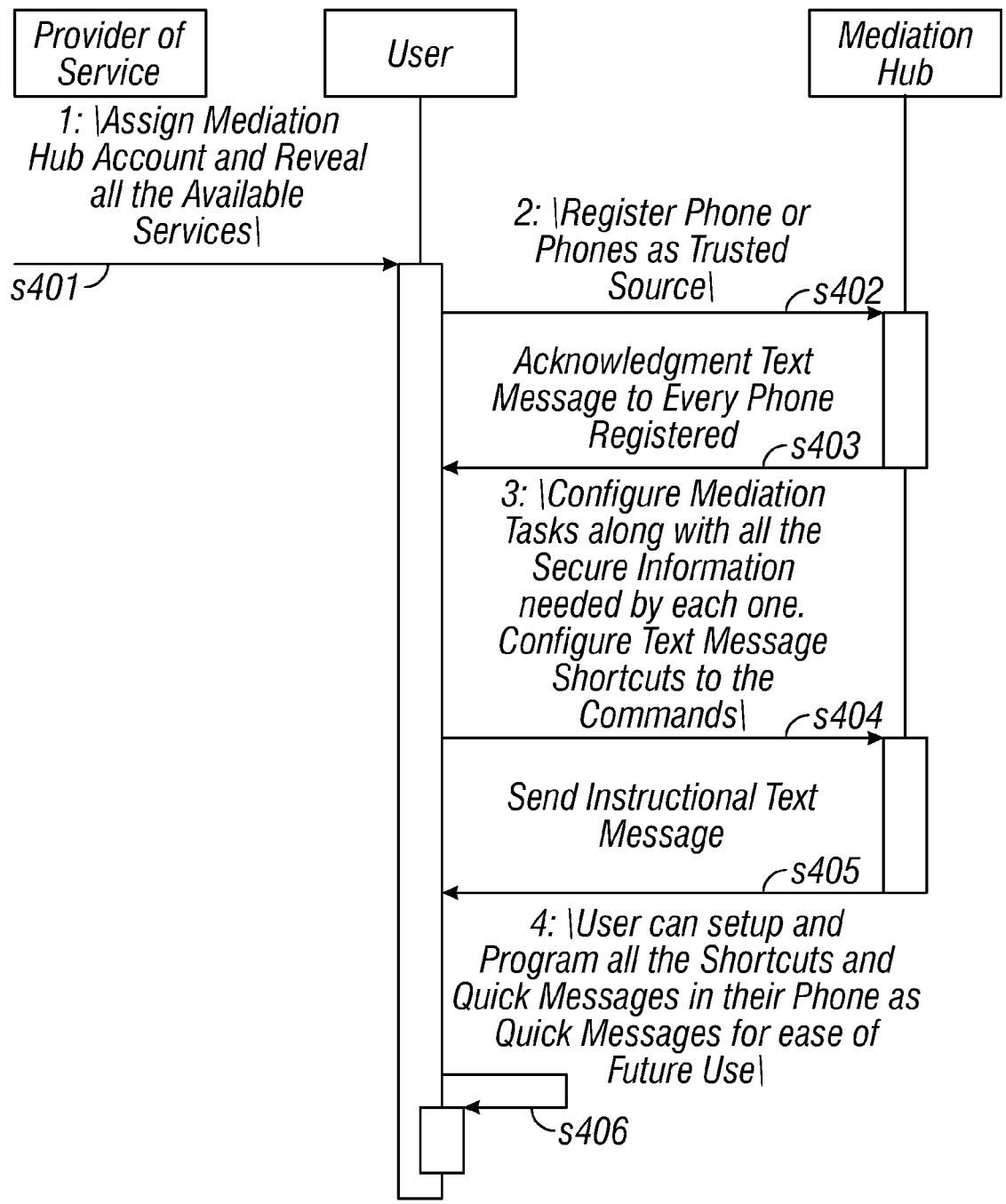
FIG. 4 illustrates a message flow for configuring a mediation hub according to one embodiment.

Method of FIG. 3 implemented in the system of FIG. 1 will now be described in more detail with reference to FIGS. 4 & 5. FIG. 4 shows the mediation hub set up sequence between provider of service 11, user 36 and mediation hub 4. Initially, the provider of service 11 assigns a mediation hub account for the user and reveals all the available services that the user can access (s401). In assigning the mediation hub account, a particular user profile is stored in the database and is also assigned to the user. The user profile can be searched or indexed by the mediation hub. The user's mobile phone or phones can then be registered with the mediation hub as a trusted source (s402). For example, the identity of the mobile phones to be used by the user to access the mediation hub can be stored in a user profile by sending the identity in SIM cards of each user mobile terminal over the text message network to the mediation hub 4. In alternative embodiments, an identity such as the MAC network address can be used in smart phones that are capable of data communication over the IP protocol.

In response, the mediation hub 4 can send an acknowledgement text message to every mobile phone registered via the text messaging network 5 (s403). Mediation tasks along with all secure information needed by each task can then be configured by the user or operator. Text message shortcuts to commands can also be configured (s404). For example, secure information for a task can be user identity and password associated with a particular internet service application and/or answers to security questions. These configurations can be stored in the user's profile. An instructional text message is sent to the user mobile phones (s405). The user can setup and program these shortcuts and messages in their phones or other user mobile terminals as quick messages for ease of future use (s406).

Whilst the mobile terminals in the example of the mediation set up method shown in FIG. 4 are mobile phones, mobile terminals other than or in addition to mobile phones can be used.

As already mentioned user profile 23 can be set up and configured by different methods. For example, in one embodiment, the user can control their own profile through SMS text messaging from the user mobile terminal The user can use commands provided by the provider of service. For example, a text message format may be defined in the mediation hub by the user or provider of service such that a text message AU:CHK;123456;999999 may represent a request to update a bank account aliased as CHK with account number 123456 and routing number 999999. The user can update his CHK bank account details stored in the their user profile by texting this message AU:CHK;123456;999999 to the mediation hub and the mediation hub in response updates the CHK bank account number and routing number stored in the user profile to 123456 and 999999, respectively. Note that the sequence AU:CHK can be something selected by the user to be specific to his or her profile and need not be a general code used by all the users.

In another embodiment, the user profile can be set up via a web front end. For example, a user could access and control their user profile stored on the mediation hub by using a web browser on their computer terminal 17 to access a web site provided by the service provider 11. By way of a further example, the user could telephone or contact an operator of a call center or help desk 8 and the operator could control the user profile on their behalf through internet, SMS or local access to the mediation hub.

Security questions are sent from the mediation hub 4 to the user mobile terminal 2 to prompt the user to return answers to the questions back to the mediation hub for identity verification during interactions with the mediation hub.

Figure 5:
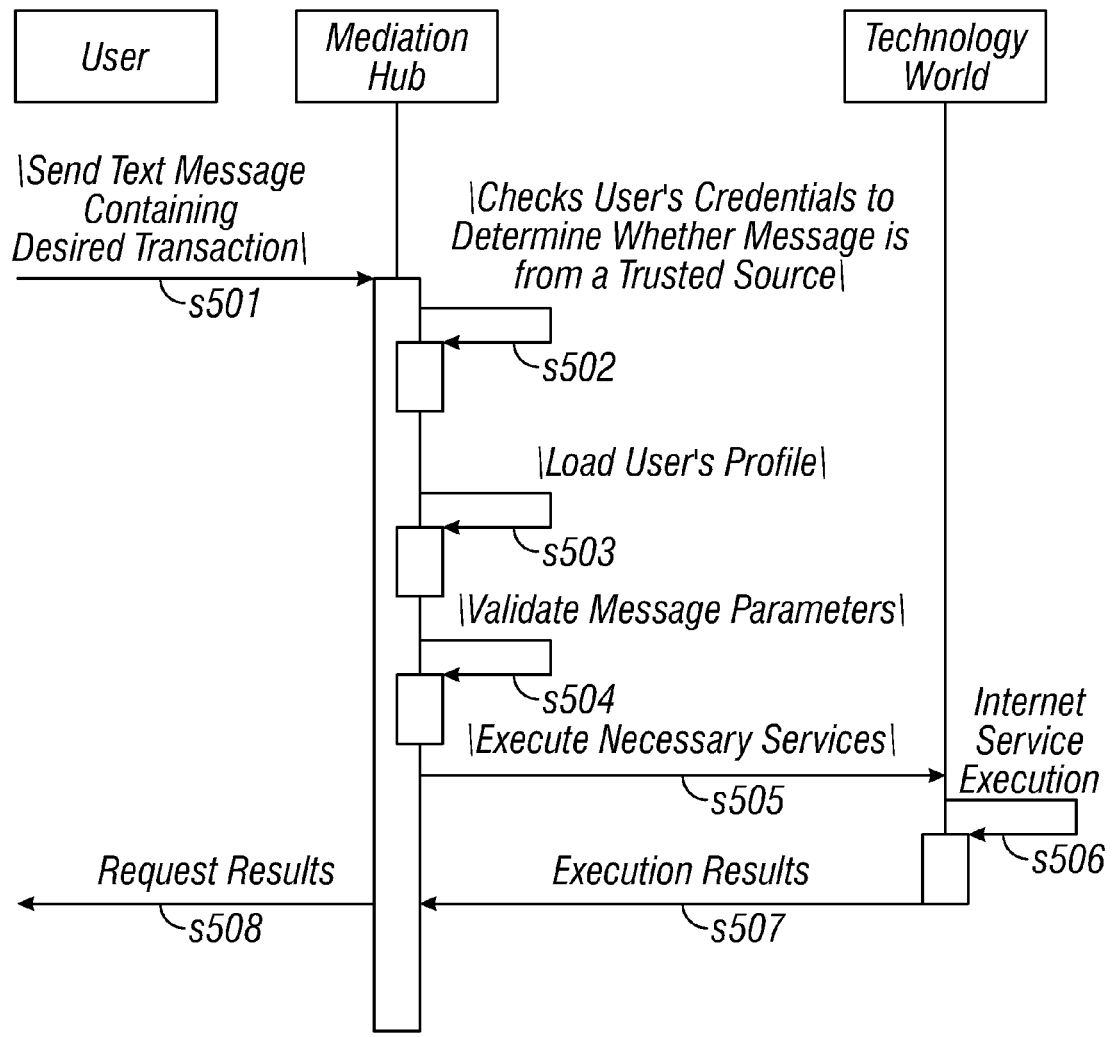
FIG. 5 illustrates a message flow for a user's interaction with the mobile phone, mediation hub, service hub, and technology world according to one embodiment.

FIG. 5 illustrates a flow of a user's interaction with the mobile phone, mediation hub 4, service hub 6, and the technology world according to one embodiment. The user sends a text message containing a desired transaction request sent to a text messaging number for accessing the mediation hub 4. As already indicated above, the mediation hub 4 is a container that is made up of the user's profile and the various IT service interfaces. The mediation hub 4 receives the sent text message 9 over the mobile telecommunication network from the user's mobile phone 2 (s501). In response to receiving the text message, the mediation hub then initially verifies the identity of the user (s502). To this end, the mediation hub checks the user's credentials contained in the received text message against those stored in mediation hub to determine whether the message is from a trusted source, as will be explained in more detail below. If identity verification is not necessary, s502 need not be implemented The mediation hub then loads a user profile associated with the user sending the text message (s503). The mediation hub can associate a particular user profile with the user sending the text message by using the verified identity of the mobile terminal to look up the particular user profile stored in the mediation hub. The user profile contains all the services that one particular user is allowed to execute as well as any shortcuts or aliases for the commands that he/she can send to execute a service. The profile also includes any configurations, such as credentials, bank account numbers, emails address, etc . . . that are needed for each service interface. The mediation hub interprets the message request and validates the message parameters (s504). The mediation hub 4 uses the user profile to interpret the text message request. When a command is received by the mediation hub, it is matched against the user profile associated with the mobile terminal to identify which service should be executed on behalf of the user. The text message content is validated such as by comparing commands provided by the user in the received text message(s) against predefined sequence stored in the user profile. As an example, the mediation hub may use the fact that the user has chosen a private text mode CHK; to announce it's desired to open and access his checking account. Other types of validation may include checking the message for being well-formed, and for containing all the required parameters.

The mediation hub 4 executes the necessary service by communicating with the particular internet service which has been identified from the user profile as being the internet service which the user wishes to execute (s505). To this end, the mediation hub 4 sends the commands or other information retrieved from the user profile for executing the identified internet service application to an internet service node 6 running that internet service application. The internet service node in turn executes a particular transaction on behalf of the user mobile terminal (s506). As mentioned above, the user profile can contain information required for the execution of a plurality of different tasks of the same internet service application and/or for the execution of a plurality of different internet service applications that can be operated by the same or different service providers. In the latter case, the mediation hub provides a useful tool for controlling and executing different internet service applications using simple text message requests which would otherwise need to be executed by the user manually accessing different internet sites and manually entering lengthy commands or inputs specified by the relevant services providers.

The internet service node running the internet service application forwards the executed result to the mediation hub (s507). The mediation hub then converts the received executed result in to a corresponding text message. If necessary, the mediation hub can again access the user profile for the purpose of converting the executed result. For example, the mediation hub could, based on the user profile, select a particular text message layout or a particular short cut through which to present the executed result. A status is returned to the user from the mediation hub containing results of the executed service (s508).

The process of verifying a user's identity (s502) will now be described in more detail. In order for the interactions to be secured between the user's mobile device and the mediation hub, a security layer is provided. The security layer accounts for possible security issues such as theft of the user's mobile terminal or spoofing of the user's mobile terminal by a hacker. Since the user is interacting with the mediation via SMS or other mobile terminal text messaging, the text messages will be in the user's mobile terminal Inbox if not cleaned by the user. This presents a security exposure in a sense that someone can pickup the user's mobile terminal and review historical text messages.

One form of security is provided by having a specific pass-phrase that is stored in the user profile. As an example, the pass-phrase of a user may be the word "Rose". When the user wants to access the mediation hub, it sends a SMS message to the mediation hub which can be any sentence comprising the word Rose. Thus, a SMS message like "I want to order a rose" or "I like a rose" or "How can I get a red rose" would be required to unlock and access the user profile before any interaction. Even if the cell-phone messages are seen by another user who has stolen the phone, unless the user is able to interpret the pass phrase of rose and send a similar SMS, the thief will not be able to unlock the user's profile. In alternate embodiments, a more complex set of interactions can be used, e.g. the exchange between the messaging hub and the user should require that the user send a text message containing a key phrase like rose, wait for a response from the messaging hub, and respond with another key phrase like daisy. An example exchange would be from the user to the messaging hub: "Order a red rose", followed by a response from the message hub as "Roses are delayed, are their other options", to which the user responds "Change order to a daisy". The sequence of key pass-phrases would be required to securely access the user's profile at the messaging hub.

As already mentioned, the user is asked a number of security questions and their answers will be stored in his/her profile. When the user interacts with the mediation hub, security question(s) are posed to verify the person's identity. The security questions can be generated dynamically by the mediation hub based on algorithms. In one embodiment, the security questions can be generated according to the following algorithm:

1) Pick one or more of the answers the user provided for the security questions in his/her profile. 2) Pick a random number of characters from the answer(s) or a whole answer. 3) Prompt the user to enter the characters that were selected by providing him/her with the positions of the characters in the answer strings. 4) Keep track of the random questions that were asked to the user in his/her profile. 5) Erase the random questions tracked if it runs out of choices and must start from the beginning or if a certain configurable value is set, which represents the number of identity verification questions asked.

A non-limiting example of mediation hub interaction security will now be described. Assume that the security questions stored in the user's profile are as follows:
Q1: What is your favorite color?
A1: blue
Q2: Who is your car maker?
A2: ford
Q3: What is your favorite animal?
A3: monkey Now here are some sample questions that the mediation hub would present to the user to verify their claimed identity:
Q: Enter first letter of car maker and second letter of favorite color
A: fl
Q Enter favorite animal
A: monkey
Q: Enter first letter of car maker, favorite animal, favorite color
A: fmb The aforementioned example illustrates that the number of questions the system can generate is quite large and will serve to accurately verify the user's identity as well as minimize the chances of identity fraud. This algorithm will also increase the gap in time between the same questions.

A method of accessing internet based service applications via a mobile terminal according to another embodiment can also include sending prompt text messages relating to the particular service or transaction to be executed from the mediation hub to the user mobile terminal to assist the user in selecting and/or executing the transaction.

Figure 6:
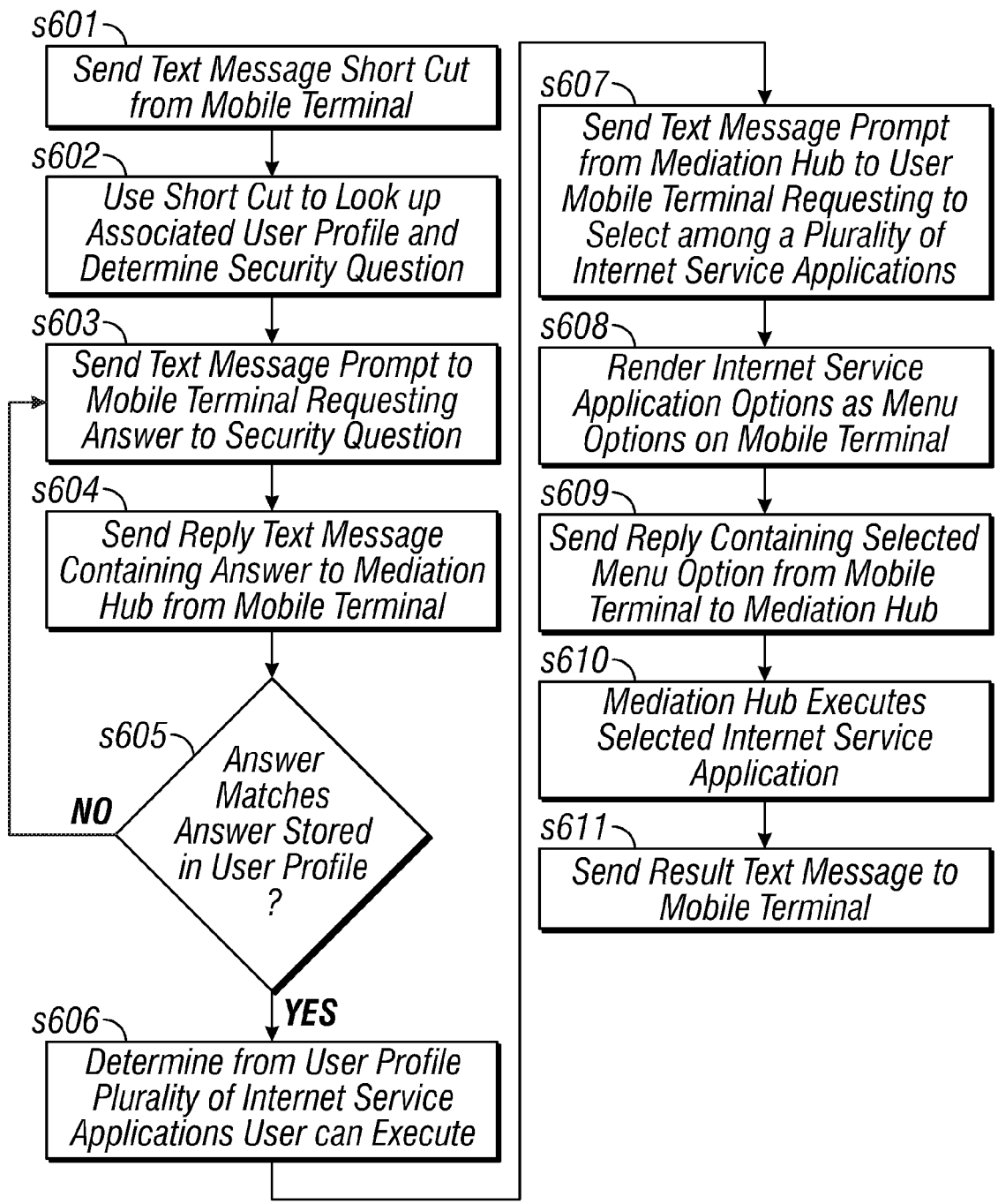
FIG. 6 illustrates a flow chart outlining a method for accessing internet based service applications via a mobile terminal according to another embodiment.

FIG. 6 illustrates a method of accessing internet based service applications via a mobile terminal which uses prompt messages according to another embodiment implemented in the system of FIGS. 1 & 2. A text message short cut is sent to the mediation hub 4 from the mobile terminal (s601). The text message short cut is used to look up an associated user profile and select a security question (s602). A text message prompt is then sent back to the user mobile terminal requesting an answer to the selected security question (s603). A text message reply containing an answer is sent to the mediation hub from the mobile terminal (s604). As indicated by s605, if the answer does not match, the process returns to s603. If the answer matches, the process continues to s606 in which the mediation hub determines from the user profile the plurality of tasks and/or internet service applications the user is set up to access (s606). A text message prompt is then sent from the mediation hub to the mobile terminal requesting to select among the determined plurality of internet service applications and/or tasks (s607). The mobile terminal renders these internet service options and/or tasks as menu options on the mobile terminal (s608). A user selects the desired menu option corresponding to the desired internet service application and/or task to be executed and a reply containing the selected menu option is sent from the mobile terminal to the mediation hub (s609). In response, the mediation hub executes the selected internet service application (s610). The mediation hub then sends a result text message back to the mobile terminal (s611).

By using simple text messages, the methods for accessing network accessible service applications according to the illustrative embodiments enable any type of mobile terminal or phone capable of a simple text message over a mobile telecommunication network to be employed. There is no need to use an intelligent device, such as a smart phone, although such intelligent devices can nevertheless also be used.

As illustrated in the non-limiting example of FIG. 6, the mediation hub can configure prompt text messages in a menu type format such that the user interaction with the mediation hub appears menu driven via the mobile terminal. By the mediation hub 4 configuring these prompt text messages in a particular format with simple text messaging, any type of phone or terminal which supports text messaging can be used to present to the user a dynamic menu based on their initial request. The interaction between the user and the mediation hub will represent a transaction. Here is a sample interaction starting with the user contacting the mediation hub via a series of text messages:

user: chkjohn Doe
proxy: Enter first letter of car maker and second letter of favorite color
user:fl
proxy: Do you want to send a check to John Doe?
user: yes
proxy: check sent. Would you like to do anything else?
Here is another sample interaction where the user does not have an aliased command as the above scenario:
user hi
proxy: Hello, please select one of the following tasks to do and reply with the menu item number:
1. Bank transactions
2. Email
3. Commerce
4. Calendar entries
5. Configure Profile
user:2
proxy: Please select a task to perform with your Email (you have 1 new email).
1. View last emails
2. Send an email
3. Delete mail
user:
proxy: Email subjects below, enter email number to view content or to quit:
1. Hello
2. Flight confirmation
3. Ann's birthday
4. You won the bid It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

The embodiments of the invention in which an exclusive property or right is claimed are defined as follows. Having thus described the invention, What is claimed is:

1. A method for executing a computer network accessible application via a mobile terminal, the method comprising:
   providing a pass phrase-protected user profile associated with a user of at least one mobile terminal, said pass phrase-protected user profile containing information for executing at least one computer network accessible application;
   receiving, over a mobile telecommunication network, at a mediation node, at least one text message from at least one mobile terminal for requesting execution of said at least one computer network accessible application;
   transmitting at least one security prompt text message from said mediation node to a user mobile terminal;
   receiving at sais mediation node at least one answer text message in response to said at least one security prompt text message;
   interpreting said at least one text message received from said mobile terminal based on said pass phrase-protected user profile;
   checking at least one answer contained in said received at least one answer text message against at least one corresponding answer stored in said user profile for verifying an identity of the user of said user mobile terminal; and
   executing said computer network accessible application using said interpretation of said at least one text message.

2. The method of claim 1:
   wherein providing said user profile associated with said user of at least one mobile terminal comprises providing information for executing a plurality of computer network accessible applications or a plurality of internet service application tasks;
   wherein interpreting said at least one text message from a user mobile terminal based on said pass phrase-protected user profile comprises using said text message to select from said information contained in said pass phrase-protected user profile for executing one of said plurality of computer network accessible applications or one of said plurality of Internet service application tasks; and
   wherein executing said computer network accessible application using said interpretation of said at least one text message comprises using said information selected from said pass phrase-protected user profile to selectively execute one of said plurality of computer network accessible applications or one said plurality of internet service application tasks.

3. The method of claim 1, further comprising:
   sending, from said mobile terminal to said mediation node, at least one text message containing a predefined security word or phrase; and
   opening or activating said user profile using said security word or said phrase.

4. The method of claim 1, further comprising:
   determining an identity of said at least one mobile terminal; and
   associating said pass phrase-protected user profile with said at least one text message based on said determined identity of said at least one mobile terminal.

5. The method of claim 1, further comprising:
   wherein said at least one text message comprises at least one text message alias or short cut; and
   wherein interpreting said at least one text message from said user mobile phone terminal based on said pass phrase-protected user profile comprises mapping said at least one text message alias or short cut to corresponding information stored in said pass phrase-protected user profile for executing said at least one computer network accessible application.

6. The method of claim 1, wherein said at least one text message comprises an SMS text message.

7. The method of claim 1, wherein providing said pass phrase-protected user profile includes setting up said user profile via a service provider.

8. The method of claim 1, further comprising configuring the pass phase-protected user profile using SMS text messaging commands sent to the mediation hub from said mobile terminal.

9. The method of claim 1, further comprising:
    determining from said pass phrase-protected user profile a plurality of different applications or internet service application tasks a user is permitted to execute;
    sending at least one text message reply to said mobile terminal from said mediation hub containing said determined plurality of internet service applications or internet service application tasks;
    rendering said plurality of internet service applications or internet service application tasks as menu options on said mobile terminal;
    receiving at said mobile terminal a selection of a particular menu options, sending from said mobile terminal to said mediation hub a reply text message containing said selected menu option; and
    executing said Internet service application corresponding to the selected menu option contained in said reply text message.

10. The method of claim 9, wherein each one of said plurality of internet service applications is provided by a different service provider.

11. An automated system for executing a computer network application via a mobile terminal, the system comprising:
    a pass phrase-protected user profile associated with a user of at least one mobile terminal, said pass phrase-protected user profile containing information for executing at least one computer network accessible application; and
    a mediation controller configured to:
    receive, over a mobile telecommunication network, at a mediation node, at least one text message from the user mobile terminal for requesting execution of said at least one computer network accessible application, wherein said at least one text message comprises at least one text message alias or short cut;
    interpret said at least one text message from said user mobile terminal based on said pass phrase-protected user profile associated with said user, wherein said interpreting comprises mapping said at least one text message alias or short cut to corresponding information for executing said at least one computer network accessible application; and
    execute said computer network accessible application using said interpretation of said at least one text message.

12. The system of claim 11, wherein said pass phrase-protected user profile associated with said user of at least one mobile terminal comprises information for executing a plurality of computer network accessible applications or a plurality of internet service application tasks, wherein said mediation controller is further configured to:
    interpret said at least one text message from said user of said mobile terminal by using said text message to select from said information contained in said pass phrase-protected user profile for executing one of said plurality of computer network accessible applications or one of said plurality of internet service application tasks; and
    using said information selected from said pass phrase-protected user profile to selectively execute one of said plurality of computer network accessible applications or one of said plurality of internet service application tasks.

13. The system of claim 11, wherein said at least one text message comprises an SMS text message.

14. A computer-usable tangible storage device storing computer program code, said computer program code comprising program instructions executable by a processor, said program instructions comprising:
    program instructions to provide a pass phrase-protected user profile associated with a user of at least one mobile terminal, said pass phrase-protected user profile containing information for executing at least one computer network accessible application;
    program instructions to receive, over a mobile telecommunication network, at a mediation node, at least one text message from a user mobile terminal for requesting execution of said at least one computer network accessible application, wherein said at least one text message comprises at least one text message alias or short cut;
    program instructions to interpret said at least one text message from said user mobile terminal based on said pass phrase-protected user profile associated with said user, wherein interpreting said at least one text message from said user mobile terminal based on said pass phrase-protected user profile further comprises program instructions to map said at least one text message alias or short cut to corresponding information stored in said pass phrase-protected user profile for executing one of said plurality of computer network accessible applications or one of said plurality of internet service application tasks; and
    program instructions to execute said internet service application using said program instructions to execute said internet service application using said interpretation of said at least one text message.

15. The computer-usable tangible storage device of claim 14, wherein providing said pass phrase-protected user profile associated with said user of at least one mobile terminal further comprises:
    program instructions to provide information for executing a plurality of computer network accessible applications or a plurality of internet service application tasks, wherein interpreting said at least one text message from said user mobile terminal based on said pass phrase-protected user profile associated with said user comprises:
    program instructions to use said text message to select from said information contained in said pass phrase-protected user profile for executing one of said plurality of computer network accessible applications or one of said plurality of internet service application tasks; and
    wherein program instructions to execute said internet service application using said interpretation of said at least one text message comprises program instructions to use said information selected from said pass phrase-protected user profile to selectively execute one of said plurality of computer network accessible applications or one of said plurality of internet service application tasks.

16. The computer-usable tangible storage device of claim 14, wherein said at least one text message comprises an SMS text message.

17. The computer-usable tangible storage device of claim 14, further comprising program instructions to configure the pass phrase-protected user profile using an SMS text messaging command received at said mobile terminal.

* * * * *